June 2, 1970   R. G. COOPER   3,516,082
TEMPERATURE SENSING DEVICES
Filed June 9, 1967   2 Sheets-Sheet 1

*Inventor*
Roy G. Cooper
By his Attorney
Richard A. Wise

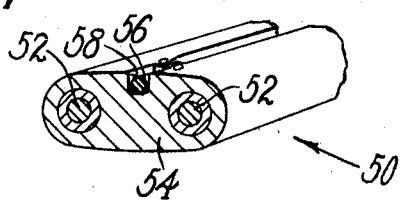
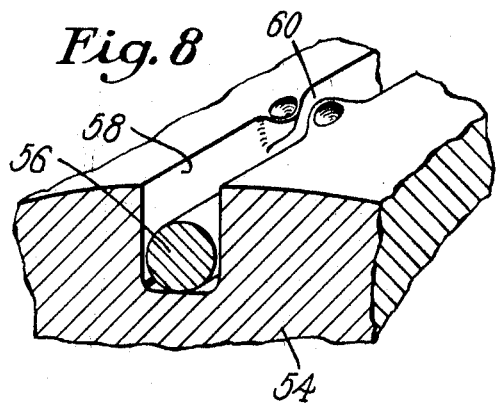
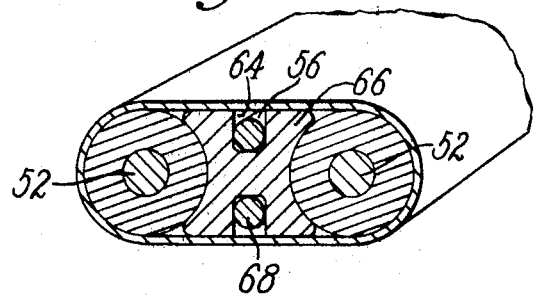
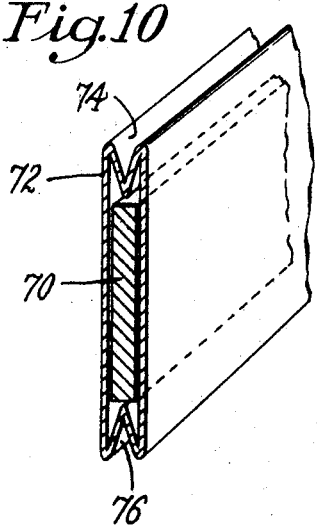
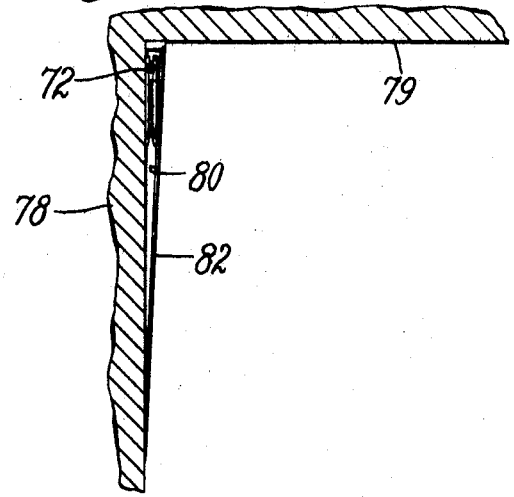

United States Patent Office 3,516,082
Patented June 2, 1970

3,516,082
TEMPERATURE SENSING DEVICES
Roy G. Cooper, Glastonbury, Conn.
(P.O. Box 286, Rancho Santa Fe, Calif. 92067)
Filed June 9, 1967, Ser. No. 644,888
Int. Cl. G08b *17/06;* H01h *37/46*
U.S. Cl. 340—227.1                                    6 Claims

ABSTRACT OF THE DISCLOSURE

A temperature detecting alarm system having temperature sensor comprising an intermetallic alloy containing from about 52 to 56 weight percent nickel and the remainder titanium which upon being exposed to a predetermined temperature, changes shape dimensionally and actuates an audio-visual signalling device.

BACKGROUND OF THE INVENTION

While this invention relates generally to heat and fire detection systems, it is more particularly directed to a system for detecting such hazards continuously about the entire uninterrupted perimeter of a predetermined area or along fixed bounds within an area.

Considered as prior art there are many useful fire detection systems employed today which are based upon electrical, chemical, and optical principles. For the most part, however, their design limits them to detecting excessive heat or fire only at finite points or within limited areas of confined spaces. For example, the typical sprinkler system for structure interiors employs low temperature alloy fuses located at spaced intervals usually near the ceiling of a room. Such a system is operative only when the temperature of the air in the room surrounding one of the fuses reaches an excessive amount, or when they are exposed to direct flame. This permits a small fire near the floor to go undetected until it reaches major proportions. The same disadvantages obtain with systems employing thermocouples or pyrometers located at fixed points within a building. Furthermore, most of these systems are generally not intended or particularly well adapted to detect fires caused by electrical wire failure or fires that start or propagate within walls.

Accordingly an object of this invention is to provide a fire or heat detection system that is capable for sensing an excessive temperature rise anywhere along a continuous uninterrupted line or perimeter at any height or at any location.

Since most fire detection systems in use today are relatively conspicuous, as evidenced by the above referred to sprinkler system with its exposed fuse mechanism, another object is to provide a system capable of sensing or detecting a temperature rise along an uninterrupted line and which system is virtually inconspicuous or capable of being hidden.

In accordance with these objects and as a general feature of this invention there will hereinafter be described a fire detection system employing a novel continuous heat sensing element in the form of a thin, flexible wire, strand, tape, or the like which may be located inconspicuously around the entire perimeter of a room or building. The sensing element may be placed on or in walls, floors, or ceilings and, as will become more apparent hereinafter, readily lends itself to integration with conventional standard wiring.

U.S. Pat. 3,174,851 discloses certain nickel-base alloys developed by and for the U.S. Government. Certain inherent properties of these alloys make them readily usable as sensor elements of fire or temperature detecting sensors. This family of alloys has been named, and will hereinafter be called generically, Nitinol, the name having been derived from Ni-Ti-Nol since the alloys comprise nickel and titanium.

According to the above-identified patent, to which reference should be made for more detailed explanation, the Nitinol alloys are intermetallic compounds and occur in three possible phases. Their formulas do not agree with formulas based on the principle of valency. However, the phases are illustrated by the following equilibrium equation:

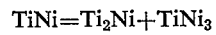

$$TiNi = Ti_2Ni + TiNi_3$$

It has been determined that the X-ray patterns of the three phases to wit, $Ti_2Ni$, $T_1N_1$, and $TiNi_3$ can be readily distinguished.

Certain of the Nitinol compounds, particularly those containing from about 52 to about 56 weight percent nickel and the remainder titanium may be, with proper thermal treatment, characterized by an almost wholly TiNi phase at room temperature and possess remarkable physical characteristics.

A basic property of these particular intermetallic compounds is their ability to be plastically transformed into a desired shape or configuration at or about room temperature and to retain that shape until heated to a somewhat higher temperature whereupon the compounds revert to a more stable shape or configuration which previously had been imparted at a substantially higher temperature.

The ability of these alloys to "remember" and revert to an original stable shape upon being heated leads to their potential utility as temperature sensors. Consequently, as another feature of this invention there will hereinafter be described a novel fire or temperature detecting system employing sensors that are made from nickel-titanium alloys.

The above and other features of the invention including various novel details of construction and combinations of elements will now be more particularly described with reference to the accompanying drawings and pointed out in the claims. It will be understood that the particular systems embodying the invention are shown by way of illustration only and not as limitations of the invention. The principles and features of this invention may be employed in varied and numerous embodiments without departing from the scope of the invention.

In the drawings,

FIGS. 7 to 9 are perspective views, partially broken away and in section of the sensor element embodied in the insulation of standard structural or household wiring;

FIG. 10 is a perspective view partially broken away and in sections of a sensor in strip form within an envelope; and FIG. 11 is a sectional view of a corner of a room at its ceiling in which the enveloped sensor strip of FIG. 10 has been installed.

Figure 1:
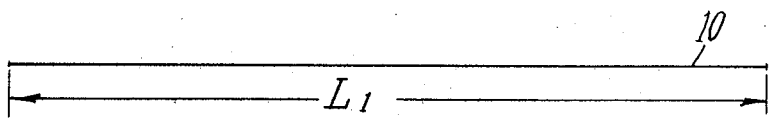
FIGS. 1 to 4, are diagrammatic representations of the shape of a Nitinol wire sensor element in original condition, after high temperature working, i.e. shape setting, after low temperature straightening and after being subjected to a fire or hazardous temperature rise respectively.

Referring to FIGS. 1 to 4, the steps of preparing an illustrative sensor element will now be described. A Nitinol wire 10 of, for example 24 gage, containing from about 52 to about 56 weight percent of nickel and the remainder titanium, is shown in FIG. 1 as having a continuous length $L_1$ which is considered its original unworked shape even though it was actually worked during its manufacture.

Figure 2:
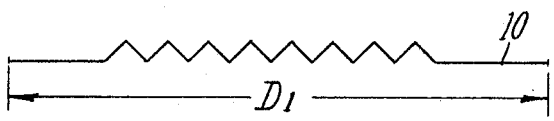
Figure 3:
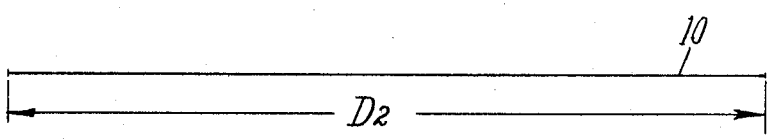

The wire is heated in air to a temperature within the range of from about 150° F. to about 1450° F. and then worked, i.e. bent, coiled, crimped or otherwise deformed which is illustrated in FIG. 2 as a saw tooth crimp. If it is worked below 800° F., it must have been previously annealed at or above 800° F. The distance between the ends of the wire is then $D_1$ while its continuous length is still $L_1$. Next the wire 10 is controlled straightened cold or at a temperature below which no dimensional change is desired but also below or within the recovery temperature range employed during the forming or working operation. For example, if it is planned that the alarm system in which the wire will be employed as the sensor is to detect and be activated at not less than 120° F., the properly hot formed wire will be cold straightened at a controlled temperature slightly less than this amount. This assures that no dimensional change will subsequently take place below the controlled cold straightening temperature and no premature actuation of the alarm circuit will occur. Cold straightening returns the wire 10 to its original shape, see FIG. 3, with the distance between ends $D_2$ and equal to its original length $L_1$.

Figure 4:
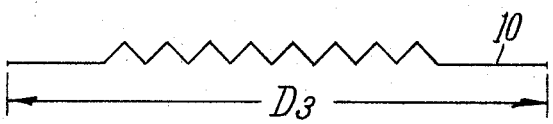

The wire 10 is now installed in an alarm circuit in any of the various forms hereinafter to be described. In usage, upon the wire being heated, as by a fire, to a temperature at or above that at which it was cold straightened it reverts to its original crimped or more stable shape as illustrated in FIG. 4 whereupon its distance between ends becomes $D_3$. Contraction from the greater distance $D_2$ to the lesser distance $D_3$, and the tension thus produced between the ends of the wire actuates the alarm as will hereinafter be explained.

It is to be understood that the specific metalurgical composition of the Nitinol sensor may be varied as well as the working temperature depending upon the results desired, the above example being illustrative rather than a limit upon the invention.

The nature of the intermetallic Nitinol alloys is such that a reversal of the shape change is possible. For example, the sensor can have a stable condition shape which is "straight," i.e. not precrimped or foreshortened, such as shown in FIG. 1. This is obtainable by annealing in the 800° F. to 1450° F. range without hot working. Thereafter, the unstable shape, FIG. 2, is induced by cold working, i.e. crimping or the like, at room temperature. The sensor, employed in an alarm system in this condition would, upon detecting a temperature in excess of that at which it was cold worked (room temperature) would straighten out assuming the FIG. 3 shape. Obviously, it would be employed in a circuit in which it pushed rather than pulled the signalling device and, more desirably, would be in the shape of a rod, strip or a generally shorter, comparatively less overall flexible form than a wire.

In an elementary form, the sensor element prepared in the above manner may be employed to actuate an alarm system mechanically by applying tension (or compression, if desired) to a switch as the sensor reverts to its stable shape upon being heated. A tension actuated circuit is illustrated in diagrammatic form in FIG. 5.

A simple alarm circuit 20 comprises audio-visual signalling means illustrated as a bell 22, a battery 24 and a single pole, single throw switch 26 held open by a spring 27, all in series. The previously prepared Nitinol sensor 28 has one end 29 fixed and the other end attached directly to the switch 26. When the sensor 28, which is then straight, detects a predetermined temperature, as for example 150° F. or higher, it rapidly reverts to its more stable crimped shape, as shown in broken line, shortening its length between ends and thereby applying tension to and closing the switch 26. This completes the alarm circuit 20 and rings the bell 22.

Figure 5:
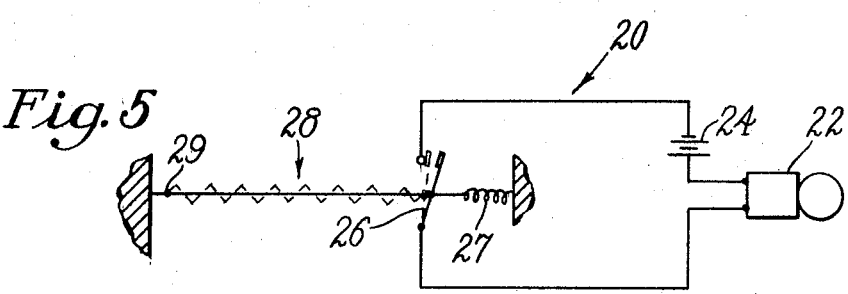
FIG. 5 is an elementary alarm circuit actuated mechanically by the sensor element.
Figure 6:
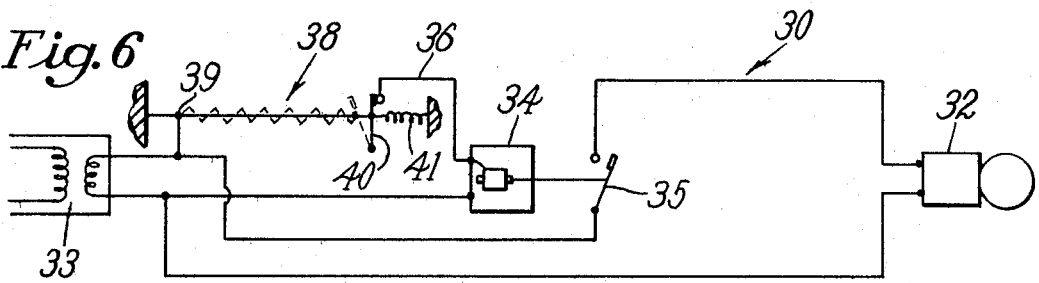
FIG. 6 is an elementary alarm circuit employing the sensor and operating on the discontinuity principle.

Another form of alarm circuit is illustrated in FIG. 6 and employs the discontinuity principle. Again there is disclosed a simple alarm circuit 30 comprising an audio-visual signalling means again illustrated as a bell 32 and may, as in the FIG. 5 circuit, employ a battery in series. However, in the illustrative embodiment it is in series circuit with the low voltage side of a bell transformer 33. A "fail-on" solenoid 34 connects the alarm circuit 30 to the sensor or detection circuit 36. The "fail-on" solenoid which may be obtained commercially in numerous forms will only be described generally. It comprises a switch portion 35 mechanically biased toward closed position as, for example, by a spring. However, the solenoid per se maintains the switch in open position as long as the solenoid receives a continuous flow of current.

The detector circuit 36 includes a Nitinol sensor 38 with one end 39 fixed and the other connected directly to a switch 40 normally closed by a spring 41. The sensor 38, the switch 40 and the solenoid portion of the switch 34 are in series with the low voltage side of the transformer 33 and form the closed detection circuit 36. The switch portion 35 of the "fail-on" solenoid 34 is maintained by the solenoid in "open" position as long as current passes through the detection circuit 36. When the sensor detects a predetermined temperature rise it returns to its more stable crimped position as shown in broken lines in FIG. 6 applying tension to the switch 40 thus interrupting or discontinuing the detector circuit 36. Failure of current renders the solenoid inactive and the switch 35 is mechanically biased into closed position thus completing the alarm circuit 30 and ringing the bell 32.

It will be appreciated that the sensor element 38 as a current carrying component of the discontinuity or detector circuit also serves as an alarm trigger when it is mechanically ruptured, broken or severed. Consequently, it may serve the dual function of both fire and burglary detection.

It is within the contemplation of this invention that multiple sensors may be employed in one circuit or combinations of circuits. In this respect the above examples of FIGS. 5 and 6 are given by way of illustration and not as limitations of the invention.

Obviously, other shapes and configurations of the sensor may be employed where the stable shape is either deformed or undeformed as explained above. The choice is dictated in part by the selection of the signalling device and the environment in which it is used. For example, a coiled hair spring sensor may be employed to actuate a signalling device by either pushing or pulling.

As a practical application, the sensor element is embodied or integrated in conventional structural wiring as illustrated in FIGS. 7 to 9. Commercial Romex insulated wire 50 is shown in FIG. 7 in perspective and includes sheathed conductor wires 52 and insulation 54. The precrimped and cold straightened Nitinol wire 56 is placed in a groove 58 extending lengthwise of the insulation 54. Whereas, the groove must be deep enough and wide enough to accept the wire freely to permit it to reassume its crimped configuration when heated, means should be provided to prevent the wire from inadvertently becoming disengaged from the groove. Accordingly, as seen in FIG. 8, the groove may be dimpled or otherwise partially closed at spaced locations 60 to prevent the wire from coming out inadvertently but still permitting the wire freedom to reassume a crimped configuration for effectively shortening itself.

As seen in FIG. 9, the sensor wire 56 may be located wholly within the outer sheath of the cable. It lies loosely within an oversized groove or slot 64 in an insulated core 66. The only structural requirement is that the wire must have freedom to reassume its crimped shape partially or wholly and to foreshorten. The core 66 may also carry a ground wire 68 while simultaneously acting as a spacer for the conductor wires 52.

Again the example of FIGS. 8 and 9 are by way of illustrations of the numerous embodiments of this feature of the invention and not as limitations. The sensor, for example, may be in the form of a flat strip lying within a dovetail slot in the insulation. It may likewise be held at spaced locations to the exterior surface of the conductor sheath, as for example, by bands of paper, fiber or plastic as long as it is free to reassume part or all of its precrimped shape and producing a linear movement and tension between ends upon being heated.

FIGS. 10 and 11 show in perspective a Nitinol sensor in the form of a relatively long, flat strip 70 contained within an expandable envelope 72. The envelope preferably is made of thin flexible film such as a polycarbonate, polyester, polypropylene, or the like. Its edges 74, 76 are turned inwardly to create a flexible bellows-like configuration permitting the sensor strip to expand, crimp or change its dimensions vertically and horizontally. The sensor element 70 is precrimped and then cold straightened as explained above before being placed in the envelope 76.

The sensor containing envelope is in a convenient form for easy handling, being thin, relatively flat and flexible it may be placed inconspicuously around a room or enclosure simply by spot adhering it to a surface or molding. Similarly, it may be placed against studs or beams.

FIG. 11 shows the sensor containing envelope 72 placed along the top edge of a wall 78 adjacent the ceiling 79. It is covered by a molding strip 80 which may be of any configuration. At the discretion of the user the molding strip may be either decorative such as exposed wood or may be slightly tapered and covered by wall paper 82.

The sensor element 70 is attached to a desired signal device as discussed above and when it is subjected to the predetermined temperature due, for example, to a fire, it reverts to its precrimped shape and actuates the alarm.

From the above examples which are illustrative and in no way limiting of the invention, it will be obvious that the continuous Nitinol sensor may assume various shapes and configurations such as round wire, flat strips or any other cross sectional configurations as may be desired. It may be employed with various alarm circuits either as plain round wire, sheathed cables in envelopes, embedded in insulation or within moldings.

Having thus described my invention, what I claim as new and desire to secure by Letters Patent of the United States is:

1. A sensor for a temperature detecting system comprising a piece of intermetallic alloy containing from about 52 to 56 weight percent nickel and the remainder titanium, said sensor being dimensionally unstable below a predetermined temperature and dimensionally more stable above said predetermined temperature whereby the sensor may be employed to actuate a signalling device when the presence of heat in excess of said predetermined temperature effects a dimensional change in the sensor, in which sensor the alloy is deformed from its original unworked shape at a temperature above said predetermined temperature and within a range of from about 150° F. to about 1450° F. and returned to its original shape at a temperature below said predetermined temperature.

2. A sensor for a temperature detecting system according to claim 1 in which the piece of intermetallic alloy is elongate in original unworked condition and foreshortened in the deformed condition.

3. A sensor for a temperature detecting system according to claim 1 in which the alloy is annealed in the undeformed, unworked condition prior to deformation at a temperature above said predetermined temperature.

4. A sensor for a temperature detecting system according to claim 1 in which the alloy is a wire assembled as a component of the insulation of structural wiring.

5. A sensor for a temperature detecting system according to claim 1 in which the alloy is a wire embedded for limited linear movement in the insulation of structural wiring.

6. A sensor for a temperature detecting alarm system according to claim 1 in which the alloy is in the form of a thin flat strip within an expandable envelope of flexible film.

References Cited

UNITED STATES PATENTS

| | | | |
|---|---|---|---|
| 2,452,942 | 11/1948 | Lord et al. | 340—227.1 |
| 2,487,156 | 11/1949 | Luttge et al. | 340—232 X |
| 2,948,789 | 8/1960 | Caldwell | 340—227.1 X |
| 2,992,310 | 7/1961 | Babany | 340—227.1 X |
| 3,174,851 | 3/1965 | Buehler et al. | |

THOMAS B. HABECKER, Primary Examiner

P. PALAN, Assistant Examiner

U.S. Cl. X.R.

337—382, 393, 395, 396; 340—232